United States Patent
Anderson

[11] 3,858,394
[45] Jan. 7, 1975

[54] COMBINED ROTARY INTERNAL COMBUSTION ENGINE AND STEAM TURBINE

[76] Inventor: Ernest W. Anderson, 5256 Mississippi Bar Dr., Orangevale, Calif. 95662

[22] Filed: Nov. 26, 1973

[21] Appl. No.: 418,876

[52] U.S. Cl. .................. 60/617, 60/623, 60/624, 123/8.05, 123/8.45
[51] Int. Cl. .................................. F01k 23/14
[58] Field of Search ............ 123/8.45, 8.05, 8.07; 60/39.61, 595–630

[56] References Cited
UNITED STATES PATENTS

| | | | |
|---|---|---|---|
| 2,274,232 | 2/1942 | Boyer | 123/8.45 |
| 3,383,092 | 5/1968 | Cazier | 60/605 X |
| 3,401,676 | 9/1968 | Wanzenberg | 123/8.05 UX |
| 3,710,569 | 1/1973 | Rinker | 60/39.61 |
| 3,809,020 | 5/1974 | Takitani | 123/8.45 |

Primary Examiner—Clarence R. Gordon
Attorney, Agent, or Firm—Blair & Brown

[57] ABSTRACT

A combined rotary internal combustion engine and steam turbine which includes a compressor unit consisting of a spherical housing having a pair of combustion chambers formed on opposite sides thereof and a spherical core repeatedly mounted in the housing. Circular veins are slidably mounted in the core and are presser forced into engagement with the walls of the housing and the combustion chambers during rotation of the core. Explosive gases are exploded in each of the chambers to force the veins therethrough. Cooling water for the housing collects as steam and the exhaust gases from the combustion chambers along with the steam is fed into a semi-spherical turbine mounted on the shaft carrying the spherical core. The internal combustion exhaust gases and the steam mixes in the exhaust to reduce pollution.

5 Claims, 7 Drawing Figures

Patented Jan. 7, 1975

Patented Jan. 7, 1975

3,858,394

3 Sheets-Sheet 2

COMBINED ROTARY INTERNAL COMBUSTION ENGINE AND STEAM TURBINE

BACKGROUND OF THE INVENTION

1. Field of the Invention

The present invention relates to combined internal combustion rotary engines and steam turbines.

2. Summary of the Invention

The combined internal combustion rotary engine and steam turbine includes a generally spherical housing having a pair of oppositely disposed combustion chambers formed therein. A spherical core rotates in the housing and has a plurality of circular veins pressure forced into contact with the walls of the housing and the combustion chamber so as to drive the core when explosive gases are ignited in the respective combustion chambers. Cooling water is converted to steam in the housing and this steam as well as the exhaust gases from the combustion chambers drives a semi-spherical turbine mounted on the same shaft carrying the spherical core. The exhaust steam and exhaust combustion gases are mixed to reduce pollution.

The primary object of the invention is to produce a highly efficient rotary engine utilizing both internal combustion and steam turbine drives.

Other objects and advantages will become apparent in the following specification when considered in light of the attached drawings.

DESCRIPTION OF THE PREFERRED EMBODIMENT

Figure 1:
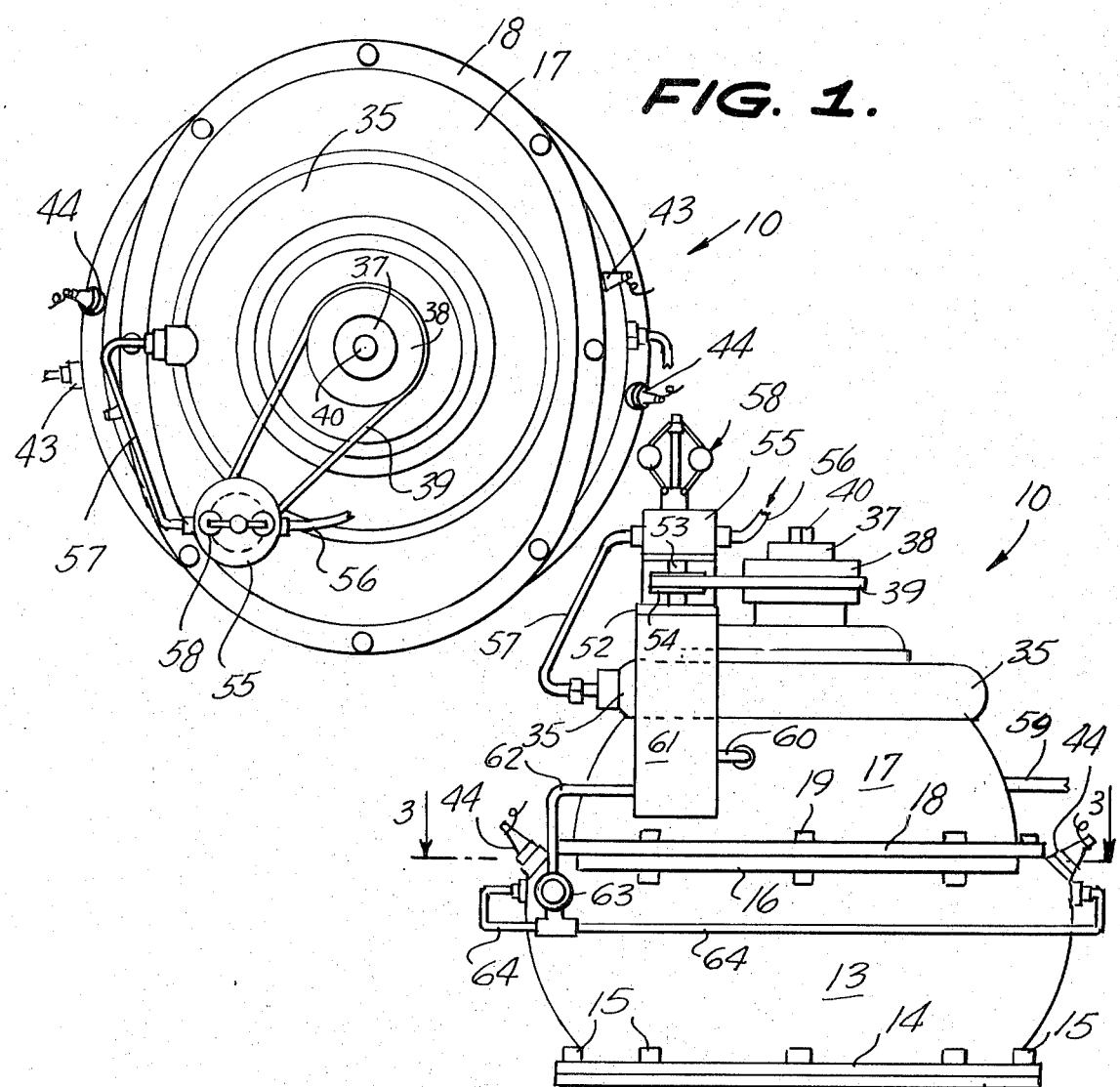
FIG. 1 is a top plan view of the invention.
Figure 2:
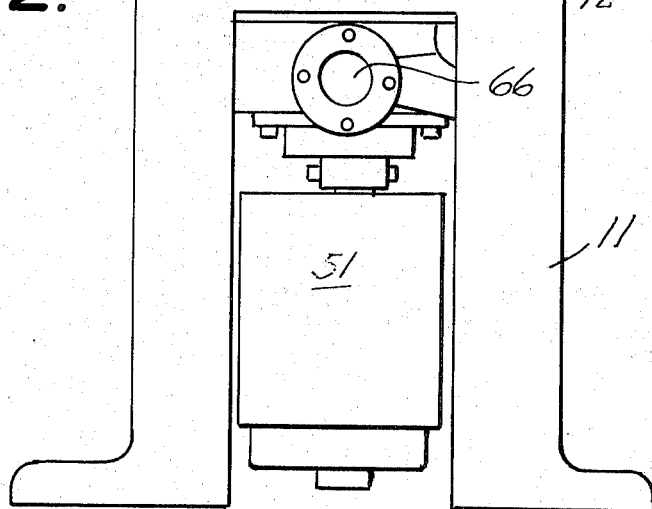
FIG. 2 is a side elevation of the invention.
Figure 3:
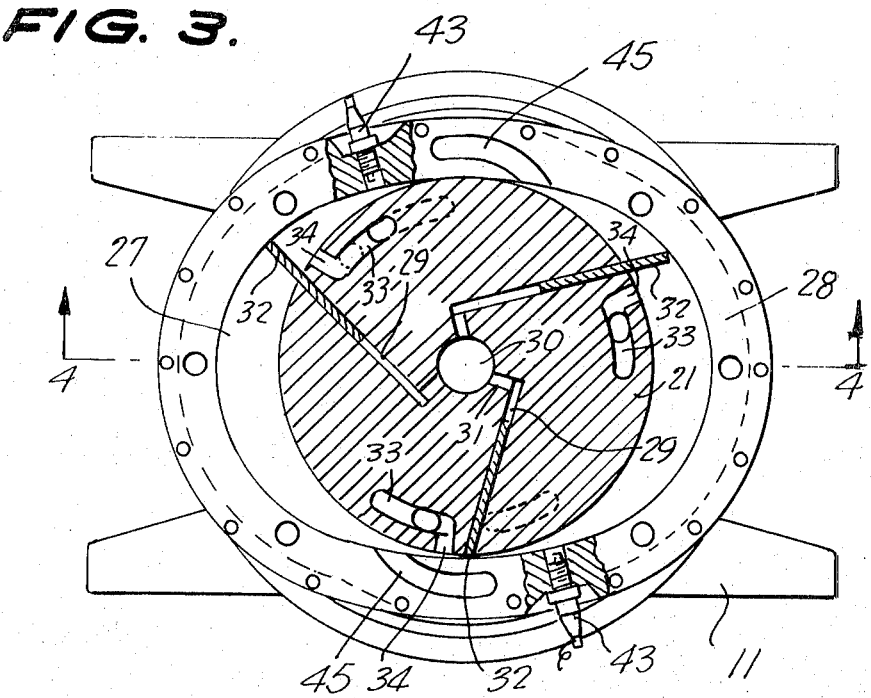
FIG. 3 is a horizontal sectional view, taken along the line 3—3 of FIG. 2, looking in the direction of the arrows.
Figure 4:
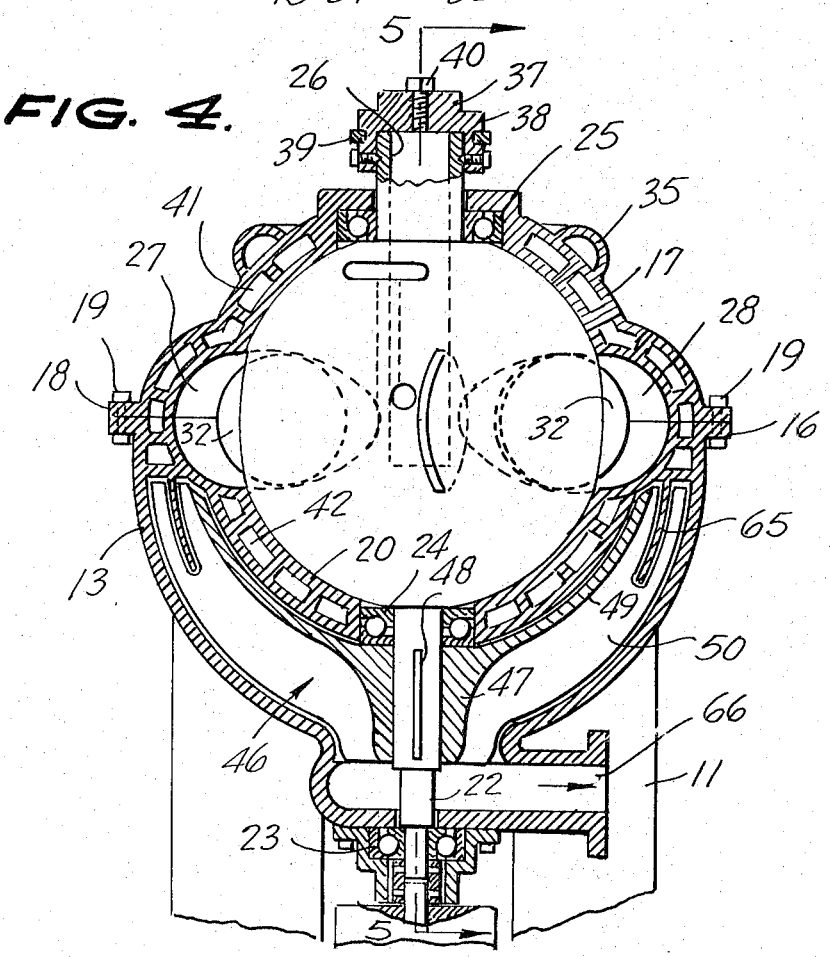
FIG. 4 is a vertical sectional view, taken along the line 4—4 of FIG. 3, looking in the direction of the arrows.
Figure 5:
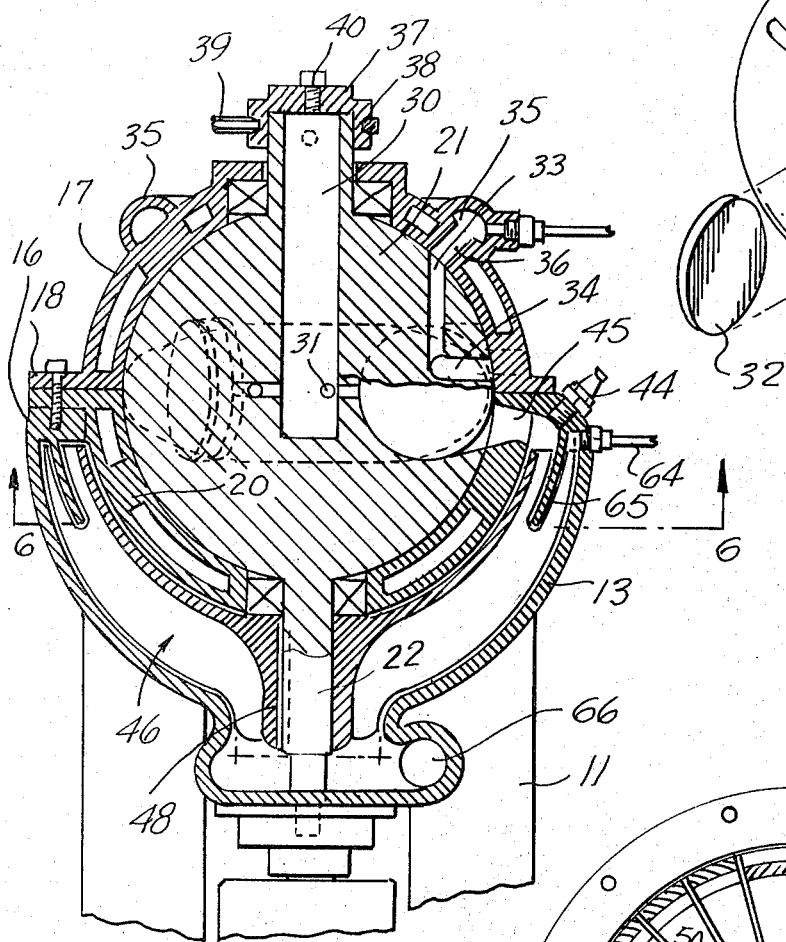
FIG. 5 is a vertical sectional view, taken along the line 5—5 of FIG. 4, looking in the direction of the arrows.
Figure 7:
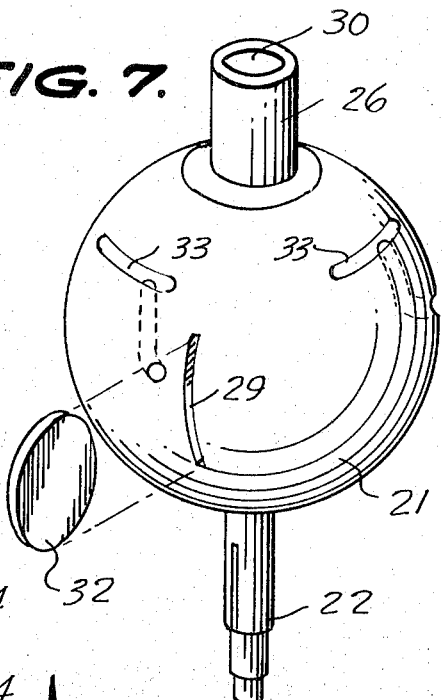
FIG. 7 is an exploded perspective view of the spherical core removed from the housing with one of the veins exploded outwardly therefrom.
Figure 6:
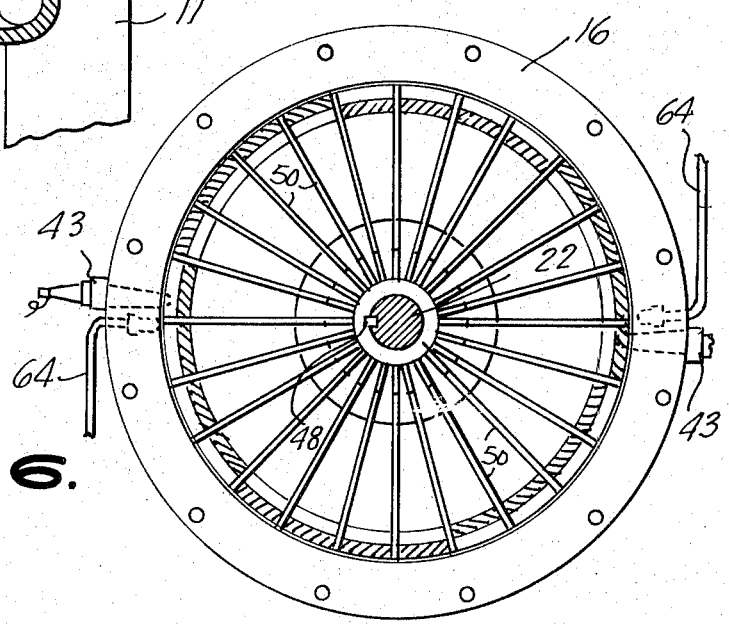
FIG. 6 is a horizontal sectional view, taken along the line 6—6 of FIG. 5, looking in the direction of the arrows.

Referring now to the drawings in detail, wherein like reference characters indicate like parts throughout the several figures, the reference numeral 10 indicates generally a combined rotary internal combustion engine and steam turbine machine constructed in accordance with the invention.

The machine 10 includes a base 11 adapted to be supported off the floor and having a generally horizontal flange 12 formed on the upper edge thereof. A lower semi-spherical housing 13 is provided with a generally horizontal flange 14 which is secured to the flange 12 by a plurality of bolts 15.

The lower housing 13 has a generally horizontal flange 16 formed on its upper edge. A semi-spherical upper housing 17 has a generally horizontal flange 18 on its lower edge which is adapted to be secured to the flange 16 by a plurality of bolts 19. A semi-spherical lower inner housing 20 is positioned within the lower housing 13 and spaced therefrom.

A substantially spherical generally solid core rotator 21 is mounted within the inner lower housing 20 and the upper housing 17 and has a lower shaft 22 mounted in a ball bearing 23 secured to the lower housing 13. A ball bearing 24 supports the upper end of the shaft 22 within the lower inner housing 20. A ball bearing 25 mounted in the upper housing 17 journals a hollow shaft 26 extending upwardly from the rotator 21. The lower portion of the upper housing 17 and the upper portion of the inner lower housing 20 are provided with a pair of oppositely disposed chambers 27, 28 for reasons to be assigned. The rotator 21 has a plurality of slots 29 opening therein with their planes angularly offset from the radial planes of the rotator 21 when considered on the axis of the shafts 22, 26. A bore 30 opens downwardly through the hollow shaft 26 and through the rotor 21 communicating at its lower ends with the slots 29 through ports 31. Circular veins 32 are mounted in the slots 29 for movement outwardly into contact with the inner walls of the housing 17 and housing 20 within the chambers 27, 28.

A plurality of elongate apertures 33 are positioned in the upper portion of the rotor 21 for communication with a bore 34 opening through the side of the rotor 21 to communicate with the chambers 27, 28. A manifold 35 surrounds the upper portion of the upper housing 17 and has a plurality of bores 36 opening into the housing 17 to communicate with the apertures 33 to permit a flow of fuel and air to flow to the chambers 27, 28 as the apertures 33 align with the bores 36.

Oil in the bore 30 flows outwardly through the bores 31 into the slots 29 behind the veins 32 to force the veins 32 outwardly against the walls of the chambers 27 and 28 as the rotor 21 rotates. The oil 30 is moved outwardly against the vein 32 by centrifugal force.

A cap 37 closes the upper end of the bore 30 and includes a pulley 38 adapted to drive a belt 39. A screw threaded plug 40 in the cap 37 permits oil to be added to the oil reservoir bore 30 as required.

The housing 17 has a water jacket 41 forming part thereof and the inner lower housing 20 has a water jacket 42 forming part thereof and cooling water is circulated through the water jackets 41, 42 as desired.

A spark plug 43 is threaded into the housing 20 opening into the chambers 27, 28 for reasons to be assigned. Additional spark plugs 44 are threaded into the housing 20 adjacent the exhaust outlet 45 for reasons to be assigned.

A steam and exhaust gas turbine generally indicated at 46 is provided with a hub 47 mounted on the shaft 22 and fixed thereon by a key 48. The hub 47 has a semi-spherical pan 49 extending upwardly therefrom and carrying a plurality of closely spaced radial blades 50 thereon. The turbine 46 is locked to the rotor 21 so as to turn therewith.

An electric generator 51 is mounted on the base 11 and has its shaft connected to the shaft 22 of the rotor 21 to be driven thereby.

An accessory mount 52 is secured to the upper housing 17 and has a shaft 53 extending vertically therethrough with a pulley 54 mounted thereon. The belt 39 is trained over the pulley 54 so as to be driven by the pulley 38 when the rotor 21 is in operation. A fuel pump 55 is secured to the accessory mount 52 and is driven by the shaft 53 so as to move the fuel from a fuel supply line 56 through a fuel supply line 57 into the manifold 35. A governor generally indicated at 58 is mounted on the upper end of the shaft 53 to be driven thereby.

A cold water supply pipe 59 extends to the water jackets 41, 42. A hot water line 60 extends from the cooling jackets 41, 42 into a water pump injector 61 driven by the shaft 53. A pipe 62 extends from the water pump injector 61 to a thermostat 63 and from there to a pipe 64 which opens into the lower housing 13 just above the turbine 46.

An arcuate angular skirt 65 is mounted in the lower housing 13 at the upper end of the turbine 46 to separate the paths of the steam entering the turbine 46 from the paths of the combustion gases entering the turbine 46 from the chambers 27, 28.

In the use and operation of the invention the generator is used as a starting motor and fuel is fed to the chambers 27 and 28 to drive the rotor 21. The exhaust gases pass out from the chambers 27, 28 through the exhaust openings 45 and down through the turbine 46 to the exhaust outlet 66. After the rotor 21 has been operating for a period of time so that the housings 20 and 17 are heated water flowed through the water jacket 41 and the water jacket 42 so as to form steam which is fed through the pipes 64 into the turbine 46 to assist in driving the turbine 46 and thus the rotor 21. The speed of the turbine 46 and the rotor 21 is controlled by governor 58 which controls the flow of fuel to the manifold 35.

The exhaust gases from the chambers 27, 28 and the exhaust steam mix in the turbine 46 and are expelled together through the exhaust outlet 66 to the atmosphere thus reducing the incident of pollution.

Having thus described the preferred embodiment of the invention it should be understood that numerous structural modifications and adaptations may be resorted to without departing from the spirit of the invention.

What is claimed is:

1. A combined rotary internal combustion engine and steam turbine comprising a substantially spherical housing having a pair of oppositely disposed combustion chambers formed therein, a substantially spherical rotor mounted for rotation in said housing, a plurality of veins mounted in said rotor for engagement with said housing and said combustion chambers, means for feeding fuel to said combustion chambers, means for exploding the fuel in said combustion chambers, a semi-spherical turbine rigidly secured to said rotor and rotating therewith, means for feeding exhaust gases from said combustion chambers to said turbine for driving said turbine, means actuated by heat from said combustion chamber for producing steam, and means for feeding the steam produced by said combustion chamber into said turbine for driving said turbine.

2. A device as claimed in claim 1 including means for controlling the supply of fuel to said combustion chambers responsive to the speed of said turbine.

3. A device as claimed in claim 1 wherein said veins are circular and centrifugally impelled oil pressure maintains said veins in contact with said housing and said combustion chambers on rotation of said rotor.

4. A device as claimed in claim 3 wherein the means for producing steam actuated by said combustion chambers comprises a water jacket formed in said housing.

5. A device as claimed in claim 1 wherein said veins are circular and clearly rotate about their own axes upon rotation of said rotor.

* * * * *